(12) United States Patent  
Zalanca et al.

(10) Patent No.: US 9,103,430 B2
(45) Date of Patent: Aug. 11, 2015

(54) POWER TRANSMITTING COMPONENT WITH A DIFFERENTIAL BEARING SYSTEM

(71) Applicant: American Axle & Manufacturing, Inc., Detroit, MI (US)

(72) Inventors: George Zalanca, Windsor (CA); Gregory J. Hilker, Canton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 188 days.

(21) Appl. No.: 13/826,458

(22) Filed: Mar. 14, 2013

(65) Prior Publication Data

US 2014/0260789 A1    Sep. 18, 2014

(51) Int. Cl.
*F16H 57/037* (2012.01)
*F16C 19/36* (2006.01)
*F16H 57/021* (2012.01)
*F16H 57/02* (2012.01)

(52) U.S. Cl.
CPC ............ *F16H 57/037* (2013.01); *F16C 19/364* (2013.01); *F16H 57/021* (2013.01); *F16H 2057/02043* (2013.01); *Y10T 74/2186* (2015.01)

(58) Field of Classification Search
CPC .... F16H 57/037; F16H 57/021; F16C 19/364
USPC ............ 74/606 R; 180/375; 60/487; 384/583, 384/569; 475/246
See application file for complete search history.

(56) References Cited

U.S. PATENT DOCUMENTS

| | | | |
|---|---|---|---|
| 2,651,216 A | 9/1953 | Alden | |
| 3,001,842 A | 9/1961 | Boyd | |
| 3,570,632 A * | 3/1971 | Williams | .................. 188/79.57 |
| 5,560,687 A | 10/1996 | Hagelthorn | |
| 6,398,689 B1 | 6/2002 | Morse et al. | |
| 6,533,697 B2 | 3/2003 | Morse et al. | |
| 7,108,428 B2 | 9/2006 | Ason et al. | |
| 7,175,560 B2 | 2/2007 | Petruska et al. | |
| 7,485,065 B2 | 2/2009 | Kearney | |
| 7,775,928 B2 | 8/2010 | Zink | |
| 7,794,153 B2 | 9/2010 | Szczepanski et al. | |

(Continued)

FOREIGN PATENT DOCUMENTS

EP    1 517 054 A1 *  3/2005  .................... 475/220
WO   WO-9833667 A1    8/1998

OTHER PUBLICATIONS http://www.merriam-webster.com/dictionary/tine Nov. 12, 2014.*

(Continued)

*Primary Examiner* — Vinh Luong
(74) *Attorney, Agent, or Firm* — Harness, Dickey & Pierce, P.L.C.

(57) ABSTRACT

A power transmitting component that includes a housing, a case, a bearing, a bearing adjuster and a clip. The housing defines a bearing bulkhead and a threaded aperture that are disposed about an axis. The bearing is coupled to the case to support the case for rotation about the axis relative to the housing. The bearing adjuster is threadably engaged to the threaded aperture and abuts the bearing. The bearing adjuster has a plurality of circumferentially spaced-apart securing features. The clip has a mount and a set of mating securing features. The clip is received on the bearing bulkhead such that the mount is secured to the bearing bulkhead in a snap-fit manner and the set of mating securing features are engaged to a corresponding set of the securing features.

9 Claims, 5 Drawing Sheets

(56) References Cited

U.S. PATENT DOCUMENTS

| | | |
|---|---|---|
| 7,931,557 B2 | 4/2011 | Zink |
| 7,998,012 B2 | 8/2011 | Zink |
| 8,167,762 B2 | 5/2012 | Zink et al. |
| 8,534,925 B1 * | 9/2013 | Stambek ................. 384/583 |
| 2001/0047655 A1 * | 12/2001 | Hauser et al. ............. 60/487 |
| 2007/0219039 A1 * | 9/2007 | Fahrni et al. .............. 475/220 |
| 2007/0269157 A1 * | 11/2007 | Fahrni et al. .............. 384/569 |
| 2009/0145683 A1 * | 6/2009 | Szczepanski et al. ........ 180/375 |
| 2012/0295753 A1 * | 11/2012 | Kwon ..................... 475/246 |
| 2013/0343691 A1 * | 12/2013 | Kwasniewski et al. ....... 384/583 |

OTHER PUBLICATIONS

Snapping—Definition and More from the Free Merriam-Webster Dictionary, merriam-webster.com, Feb. 23, 2014.*

* cited by examiner

POWER TRANSMITTING COMPONENT WITH A DIFFERENTIAL BEARING SYSTEM

FIELD

The present disclosure relates to a power transmitting component with a differential bearing system.

BACKGROUND

This section provides background information related to the present disclosure which is not necessarily prior art.

Various power transmitting components, such as an automotive axle assembly, employ a differential assembly that permits speed differentiation between two output members. A conventional automotive axle assembly can include an axle housing, an input pinion that is mounted in the axle housing for rotation about a first axis, a differential that is mounted in the axle housing for rotation about a second axis and a ring gear that is mounted to the differential and meshingly engaged to the input pinion. Many of these axle assemblies further include a differential bearing system that can include a pair of differential bearings and a pair of threaded bearing adjusters. The differential bearings can support the differential for rotation on the axle housing, while the threaded bearing adjusters are configured to be rotated relative to another component to permit the differential bearings (and therefore the differential) to be positioned along the second axis and/or to apply a desired amount of preload to the differential bearings.

A locking system is typically employed to inhibit movement of the threaded bearing adjuster relative to another structure (e.g., the axle housing). Exemplary locking systems are disclosed in U.S. Pat. Nos. 3,001,842; 6,398,689; 7,485,065 and 7,794,153, as well as in U.S. Publication No. 2006/0276298. Such locking systems typically comprise a clip that engages the threaded bearing adjuster, and may include a fastener for retaining the clip to the axle housing. While such differential bearing systems are suited for their intended use, there nonetheless remains a need in the art for an improved differential bearing system.

SUMMARY

This section provides a general summary of the disclosure, and is not a comprehensive disclosure of its full scope or all of its features.

In one form, the present teachings provide a power transmitting component that includes a housing, a case, a bearing, a bearing adjuster and a clip. The housing defines a bearing bulkhead and a threaded aperture that are disposed about an axis. The bearing is coupled to the case to support the case for rotation about the axis relative to the housing. The bearing adjuster is threadably engaged to the threaded aperture and abuts the bearing. The bearing adjuster has a plurality of circumferentially spaced-apart securing features. The clip has a mount and a set of mating securing features. The clip is received on the bearing bulkhead such that the mount is secured to the bearing bulkhead in a snap-fit manner and the set of mating securing features are engaged to a corresponding set of the securing features.

In another form, the present teachings provide a power transmitting component that includes a housing, a case, a pair of bearings, a pair of bearing adjusters and a pair of clips. The housing defines a pair of bearing bulkheads and a pair of threaded apertures that are disposed about an axis. The case is received between the bearing bulkheads. The bearings are coupled to the case to support the case for rotation about the axis relative to the housing. Each of the bearing adjusters is threadably engaged to an associated one of the threaded apertures and abuts an associated one of the bearings. Each of the bearing adjusters has a plurality of circumferentially spaced-apart securing features. Each of the clips has a mount and a set of mating securing features. Each of the clips is received on an associated one of the bearing bulkheads such that the mounts squeeze the bearing bulkheads and the set of mating securing features are engaged to a corresponding set of the securing features.

In still another form, the present teachings provide a power transmitting component that includes a housing, a case, a pair of bearings, a pair of bearing adjusters and a pair of clips. The housing defines a pair of bearing bulkheads and a pair of threaded apertures that are disposed about an axis. The case is received between the bearing bulkheads. The bearings are coupled to the case to support the case for rotation about the axis relative to the housing. Each of the bearing adjusters is threadably engaged to an associated one of the threaded apertures and abuts an associated one of the bearings. Each of the bearing adjusters has a plurality of circumferentially spaced-apart securing features. Each of the clips has a mount and a set of mating securing features. Each of the mounts is engaged to opposite sides of an associated one of the bearing bulkheads. The set of mating securing features is engaged to a corresponding set of the securing features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
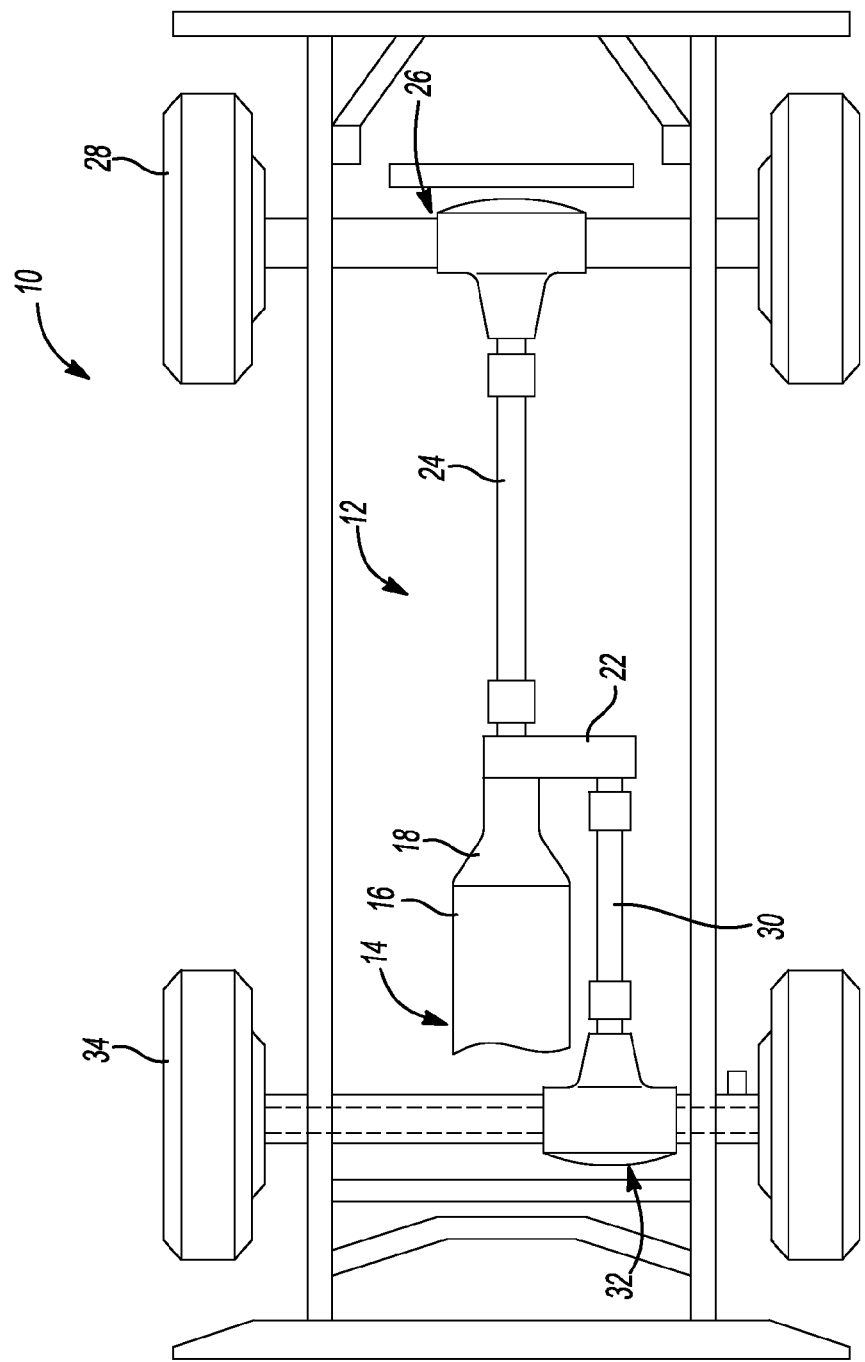
FIG. 1 is a schematic illustration of a vehicle having a power transmitting component (i.e., a rear axle assembly) constructed in accordance with the teachings of the present disclosure.

With reference to FIG. 1 of the drawings, a vehicle having a power transmitting component (e.g., rear axle assembly 26) constructed in accordance with the teachings of the present disclosure is generally indicated by reference numeral 10. The vehicle 10 can include a driveline 12 that is powered (i.e., driven) by a power train 14. The power train 14 can include an engine 16 and a transmission 18. The driveline 12 can include a transfer case 22 or other power distributing device, a rear propshaft 24, a rear axle assembly 26, a plurality of rear wheels 28, a front propshaft 30, a front axle assembly 32 and a pair of front wheels 34. The engine 16 can be mounted in an in-line or longitudinal orientation along the longitudinal axis of the vehicle 10 and its output can be coupled to the input of the transmission 18 in a conventional manner to transmit rotary power (i.e., drive torque) therebetween. The transmission 18 can include an output and a gear reduction unit that can be employed to couple the transmission input to the transmission output at a selected gear or speed ratio.

The transfer case 22 can be a conventional transfer case and can be coupled to the transmission 18 configured to transmit rotary power to the rear axle assembly 26 and the front axle assembly 32 in a desired manner. For example, the transfer case 22 can be operable in a first mode in which rotary power is transmitted only to the rear axle assembly 26 and in a second mode in which drive torque is allocated between the rear and front axle assemblies 26 and 32 in a predetermined manner.

The rear propshaft 24 is conventional and couples a rear output of the transfer case 22 to an input of the rear axle assembly 26. The rear wheels 28 are coupled to and driven by the rear axle assembly 26 in a conventional manner. The front propshaft 30 is conventional and couples a front output of the transfer case 22 to the front axle assembly 32, which can be constructed in a manner that is similar to the rear axle assembly 26. The front wheels 34 are coupled to and driven by the front axle assembly 32.

Figure 2:
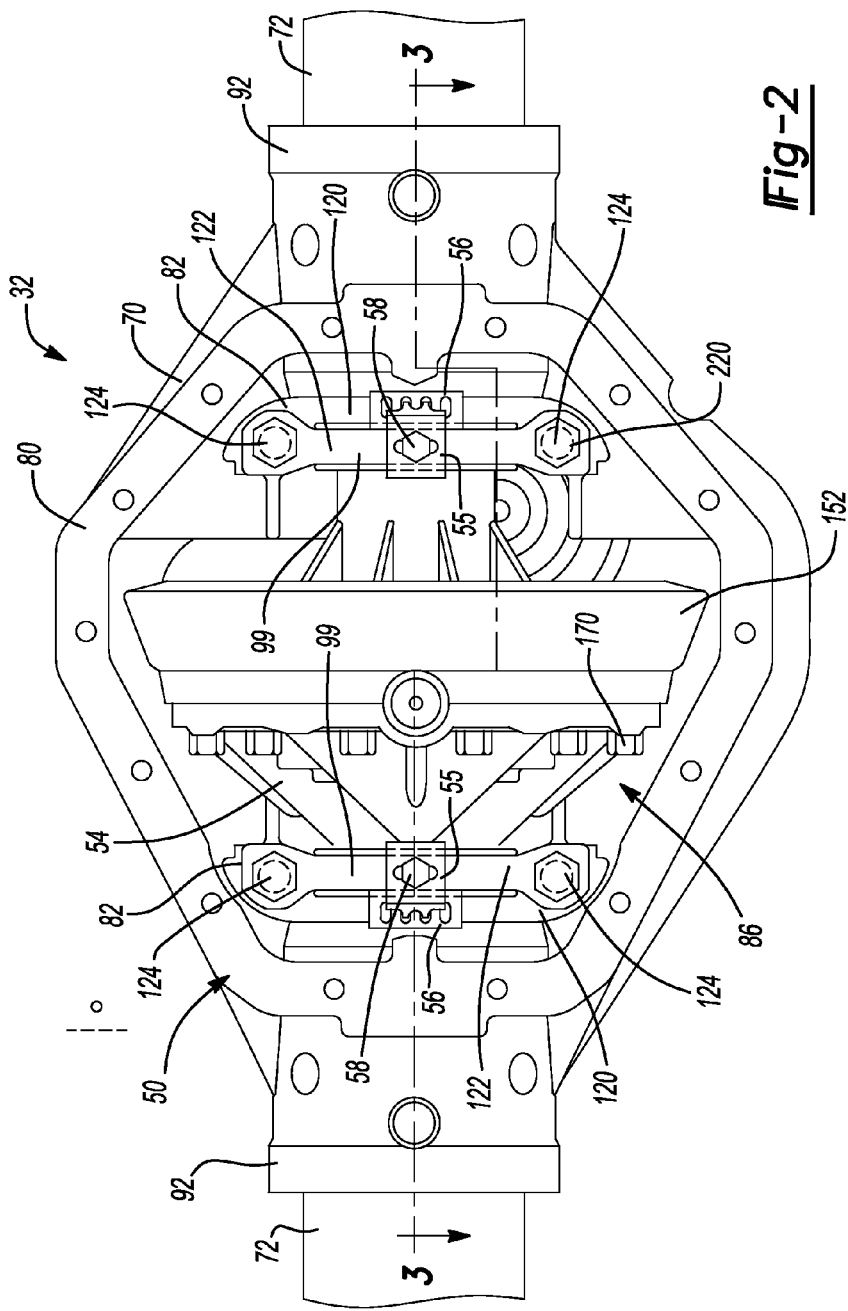
FIG. 2 is a rear elevation of a portion of the vehicle of FIG. 1 illustrating a portion of the rear axle assembly in more detail.
Figure 3:
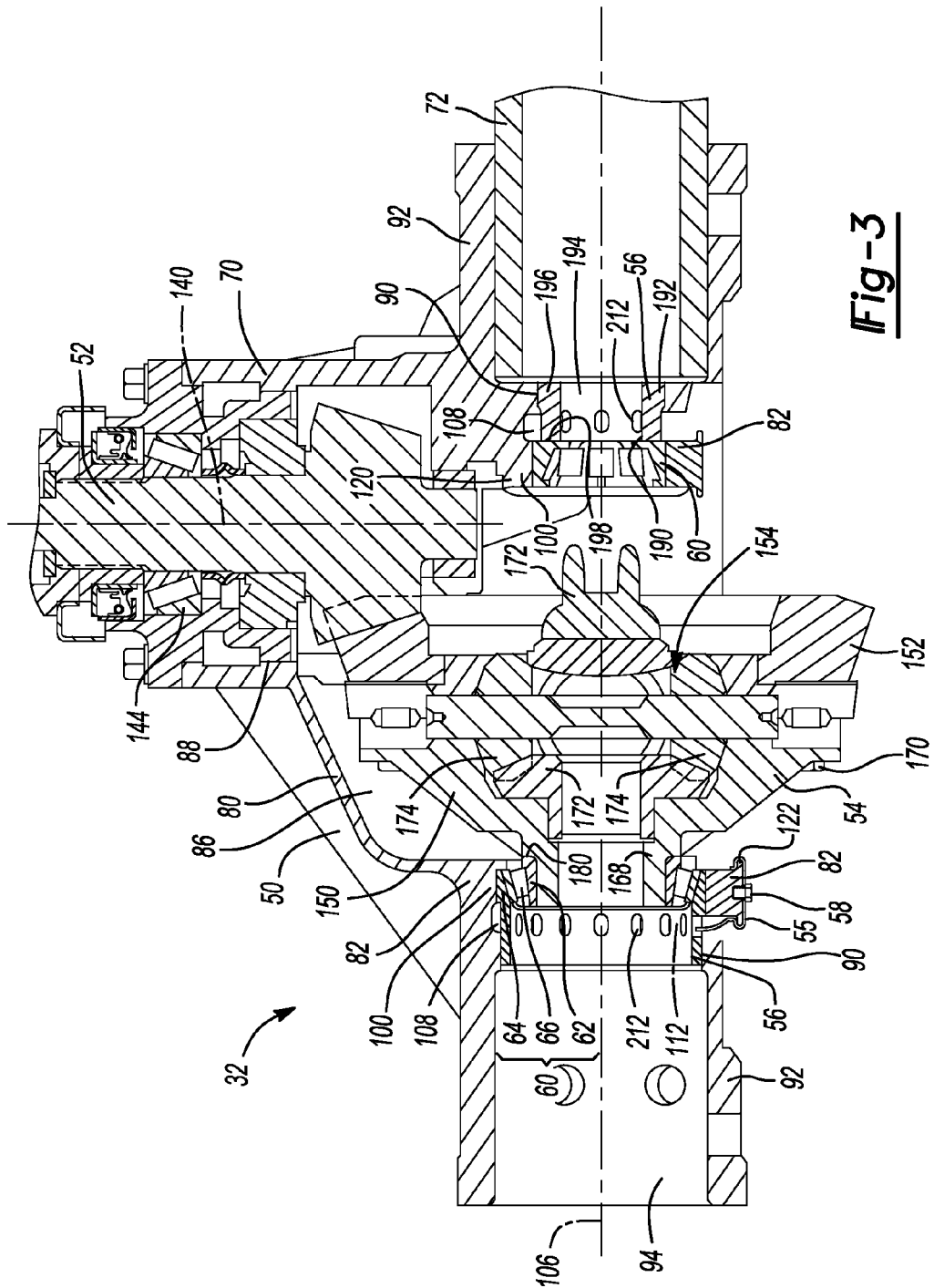
FIG. 3 is a sectional view taken along the line 3-3 of FIG. 2.

With reference to FIGS. 2 and 3, the rear axle assembly 26 can include an axle housing 50, a pinion 52, a differential assembly 54, a pair of bearing adjusters 56, a pair of clips 55, a pair of threaded fasteners 58 and a pair of differential bearings 60, each of which having an inner bearing race 62, an outer bearing race 64, and a plurality of bearing elements 66 disposed between the inner and outer bearing races 62 and 64. The axle housing 50 can include a carrier housing 70 and a pair of axle tubes 72. For clarity, one of the axle tubes is not shown in FIG. 3.

The carrier housing 70 can include a wall member 80 and a pair of bearing bulkhead structures 82. The wall member 80 can define a cavity 86 as well as a pinion bore 88, a pair of threaded adjuster bores 90, and a pair of collars 92 that can define respective axle tube bores 94. The bearing bulkhead structures 82 can be disposed in the cavity 86 and interconnected to the wall member 80. Each bearing bulkhead 82 can define a bearing seat 100 and a fastener aperture 104. The bearing seats 100 can define a rotational axis 106 around which the differential assembly 54 can be rotatably mounted. If desired, an annular groove 108 can be formed into each bearing bulkhead 82 between the bearing seat 100 and the threaded adjuster bore 90. The threaded adjuster bore 90 can be disposed on an outboard side of an associated one of the bearing seats 100. The fastener aperture 104 can be formed into an end 99 of each bearing bulkhead 82. If desired, the bearing bulkheads 82 can be unitarily and integrally formed with and non-removably coupled to the wall member 80, but in the particular example provided, each bearing bulkhead 82 includes a bulkhead structure 120, which is unitarily and integrally formed with the wall member 80, and a bearing cap 122 into which the fastener aperture 104 extends. A pair of threaded fasteners 124 is employed to fixedly but removably couple the bearing cap 122 to its associated bulkhead structure 120.

Figure 4:
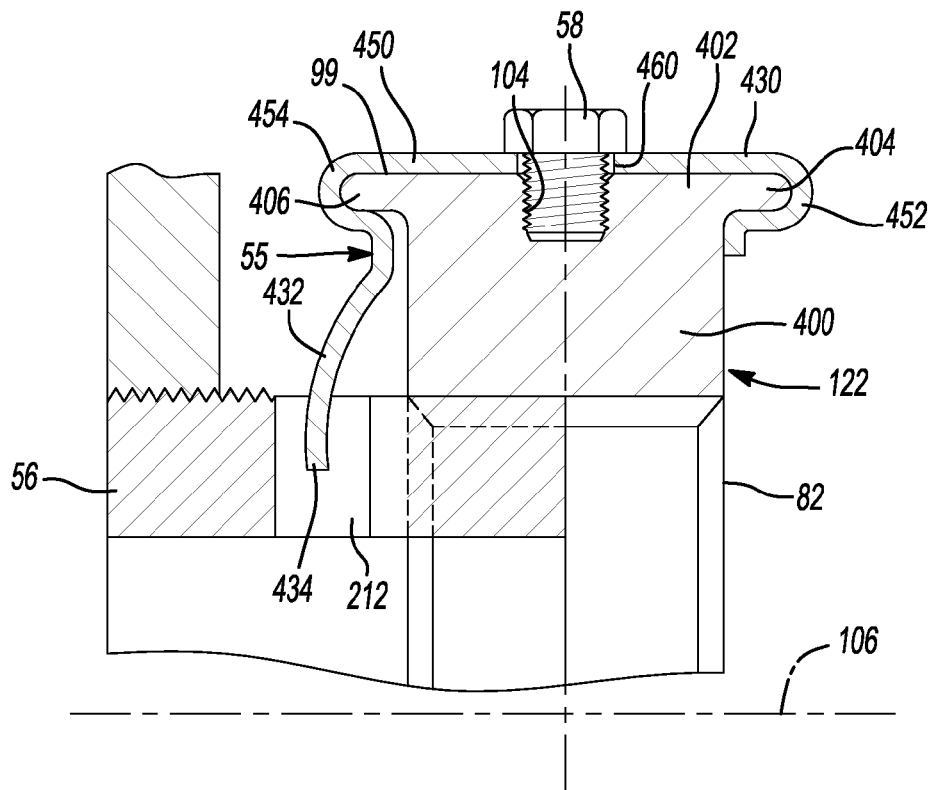
FIG. 4 is an enlarged portion of FIG. 3 illustrating a bearing cap, a clip, a threaded fastener and a threaded adjuster in more detail.
Figure 5:
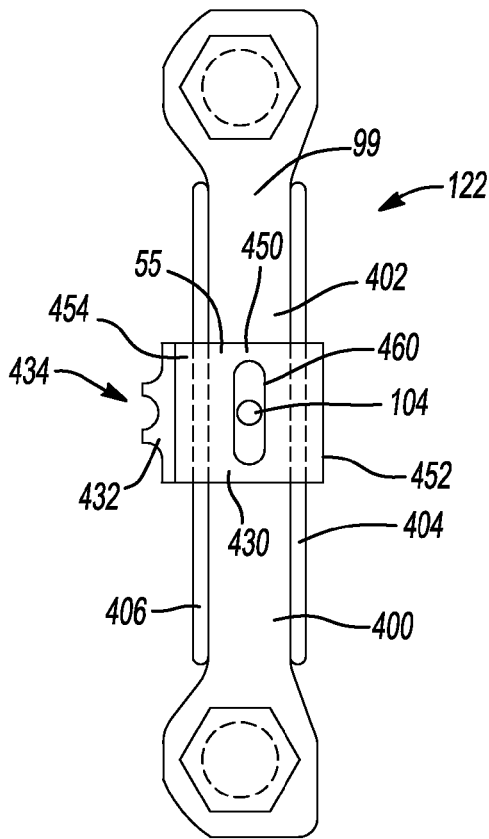
FIG. 5 is an enlarged portion of FIG. 2 illustrating the bearing cap and the clip in more detail (the threaded fastener that secures the clip to the bearing cap has been omitted for purposes of clarity)

With reference to FIGS. 4 and 5, the bearing cap 122 can include a generally U-shaped cap structure 400, a flange member 402, a first rail 404 and a second rail 406. The flange member 402 can be disposed on an end of the cap structure 400. The first and second rails 404 and 406 can be fixedly coupled to opposite lateral sides of the flange member 402 such that a cross-section of the bearing cap 122 taken through the cap structure 400, the flange member 402 and the first and second rails 404 and 406 can be generally T-shaped. The first and second rails 404 and 406 can be parallel one another and can be disposed generally perpendicular to the rotational axis 106. Each of the fastener apertures 104 can extend through an associated one of the flange members 402 and into the cap structure 400.

Returning to FIGS. 2 and 3, the pinion bore 88 can be disposed about a second axis 140 that can be generally perpendicular to the rotational axis 106. The pinion 52 can be received in the pinion bore 88 and supported on pinion bearings 144 for rotation about the second axis 140.

Each axle tube 72 can be a hollow, tubular structure that can be received into a respective one of the collars 92. If desired, the axle tubes 72 can engage the collars 92 in a press-fit or interference-fit manner. Slug welds (not shown) can be employed to inhibit axial and rotational movement of the axle tubes 72 relative to the carrier housing 70.

With reference to FIG. 3, the differential assembly 54 can include a differential case 150, a ring gear 152, and a means for dividing power between a pair of output members, such as a gear set 154. The differential case 150 can be received between the bearing bulkheads 82 and can define a case cavity 164, into which the gear set 154 is received, and a pair of bearing hubs 168 (only one shown). The ring gear 152 can be coupled to the differential case 150 by any suitable means, such as laser welding or via a plurality of threaded fasteners 170 (FIG. 2). The gear set 154, which can include a pair of side gears 172 and a pair of pinion gears 174, can be received in the case cavity 164. The bearing hubs 168 can be generally tubular projections formed onto the opposite sides of the differential case 150. Each of the inner bearing races 62 can be mounted on a corresponding one of the bearing hubs 168 and abutted against a shoulder 180 defined by the bearing hub 168 such that the differential bearings 60 are coupled to the differential case 150 to support the differential case 150 for rotation about the rotational axis 106 relative to the carrier housing 70.

Each bearing adjuster 56 can include a body portion 190, an adjustment portion 192 and a longitudinally extending bore 194 that can be formed longitudinally through the bearing adjuster 56. The body portion 190 can include an externally threaded portion 196 and an inboard end surface 198. The threaded portion 196 is sized to be threadably received in the threaded adjuster bore 90 such that the inboard end surface 198 is abutted against the outer bearing race 64. The adjustment portion 192 can be configured to be engaged by a tool (not shown) to rotate the bearing adjusters 56 to both preload the differential bearings 60, as well as to set the lash between the pinion 52 and the ring gear 152 and/or a desired gear tooth contact pattern. The adjustment portion 192 can include a plurality of circumferentially spaced apart securing features 212. In the particular example provided, the securing features 212 comprise slotted apertures that can be formed entirely through the bearing adjusters 56 and which can extend longitudinally in a direction that is generally parallel with the rotational axis 106.

With reference to FIGS. 4 and 5, the clips 55 can be formed of a suitable material such as sheet spring steel. Each of the clips 55 can have a mount 430, at least one spring member 432 and a set of mating securing features 434. Each mount 430 can have a seat 450, a first clip member 452, which can be fixed to a first end of the seat 450, and a second clip member 454 that is fixed to a second end of the seat 450 opposite to the first end of the seat 450. The seat 450 can define a fastener aperture 460 and can abut the end of the flange member 402 (i.e., the end 99 of the bearing bulkhead 82). The first clip member 452 can be engaged to the first rail 404 such that it wraps around the first rail 404 and abuts the flange member 402 on a side opposite the seat 450. If desired, the first clip member 452 can be slidably received on the first rail 404. Similarly, the second clip member 454 can be engaged to the second rail 406 such that it wraps around the second rail 406 and abuts the flange member 402 on the side opposite the seat 450 such that the first and second clip members 452 and 454 are disposed on opposite sides of the bearing bulkhead 82 to which the clip 55 is mounted. If desired, the second clip member 454 can be slidably received on the second rail 406. The spring member 432 can extend from the second clip member 454 and can be configured to squeeze or apply a compressive force to the bearing bulkhead 82 that resists movement of the clip 55 relative to the bearing bulkhead 82. The mating securing features 434 can be coupled to an end of the spring member 432 on an end opposite the second clip member 454. The mating securing features 434 can be configured to engage a set of the securing features 212 on the bearing adjuster 56. The mating securing features 434 can comprise one or more tines that can be received into a corresponding quantity of the securing features 212 (slotted apertures in the example provided).

During the assembly process, each of the clips 55 can be received on an associated one of the bearing bulkheads 82 such that the mounts 430 are secured to the bearing bulkheads 82 in a snap-fit manner. For example, the first clip member 452 can be engaged to the first rail 404 and the clip 55 can be rotated about the first rail 404 to snap-fit engage the second clip member 454 to the second rail 406. If the mount 430 of the clip 55 is configured to slide on the bearing cap 122, the mating securing features 434 can be aligned to the securing features 212 prior to snap-fit engaging the second clip member 454 to the second rail 406. The threaded fasteners 58 can be received through the fastener aperture 460 in the seats 450, threadably engaged to the fastener apertures 104 and tightened to apply a clamp force to the clips 55 to inhibit movement of the clips 55 relative to the bearing caps 122. To accommodate sliding movement of the clip 55 relative to the bearing cap 122, the fastener aperture 460 in the seats 450 can be slotted in a direction that is parallel to the rotational axis 106.

From the foregoing, those of skill in the art will appreciate from this disclosure that the bearing bulkheads 82, the securing features 212, the clips 55 and the threaded fasteners 58 cooperate to form a locking system for inhibiting relative rotation between the axle housing 50 and the bearing adjusters 56.

Figure 6:
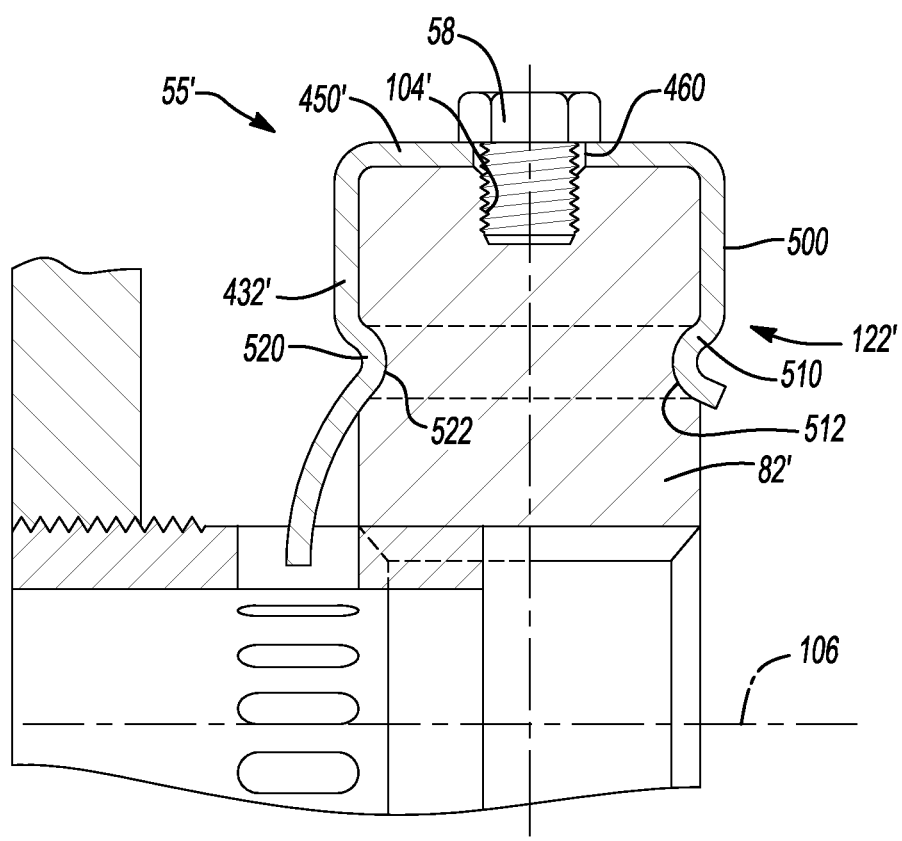
FIG. 6 is a view similar to that of FIG. 4 but depicting a portion of an alternately constructed axle assembly.

While the clip 55 has been described as having a mount 430 that is configured to engage a bearing bulkhead 82 having a flange member 402 with first and second rails 404 and 406, it will be appreciated that the clip 55 (and the bearing bulkhead 82) could be formed somewhat differently. In the example of FIG. 6, each clip 55' can have a seat 450', a first spring member 500 and a second spring member 432'. The first and second spring members 500 and 432' can be coupled to opposite ends of the seat 450 and can cooperate to apply a compressive force to (i.e., squeeze) the bearing bulkheads 82'. The first spring member 500 can terminate at a first foot 510 that can be received into a first groove 512 that is formed in the bearing cap 122'. Similarly, the second spring member 432' can have a second foot 520 that can be received into a second groove 522 in the bearing cap 122'. The first and second grooves 512 and 522 can extend perpendicular to the rotational axis 106 to permit the clip 55' to be slidably received on the bearing cap 122'. The threaded fasteners 58 can be received through apertures 460 in the seats 450' and the fastener apertures 104' in the bearing caps 122'. The threaded fasteners 58 can be tightened to apply a clamping force to the seat 450' to inhibit movement of the clip 55' relative to the bearing cap 122'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
a housing defining a bearing bulkhead and a threaded aperture that are disposed about an axis;
a case;
a bearing coupled to the case to support the case for rotation about the axis relative to the housing;
a bearing adjuster threadably engaged to the threaded aperture and abutting the bearing, the bearing adjuster having a plurality of circumferentially spaced-apart securing features; and
a clip having a mount and a set of mating securing features, the clip being received on the bearing bulkhead such that the mount is secured to the bearing bulkhead in a snap-fit manner and the set of mating securing features are engaged to a corresponding set of the securing features;
wherein the bearing bulkhead has a flange member and a first rail, the first rail being coupled to the flange member and extending perpendicular to the axis, and wherein the mount has a seat and a first clip member that is fixed to a first end of the seat, the seat abutting an end of the flange member, the first clip member being engaged to the first rail such that it wraps around the first rail and abuts the flange member on a side opposite the seat.

2. The power transmitting component of claim 1, wherein the flange member has a second rail that is coupled to the flange member and extends parallel to the first rail, and wherein the mount has a second clip member that is fixed to a second end of the seat opposite to the first end, the second clip member being engaged to the second rail such that it wraps around the second rail and abuts the flange member on the side opposite the seat, wherein the first and second clip members are disposed on opposite sides of the bearing bulkhead.

3. The power transmitting component of claim 2, wherein the clip is slidably mounted on the first and second rails.

4. The power transmitting component of claim 1, wherein the first clip member is slidably mounted on the first rail.

5. A power transmitting component comprising:
a housing defining a bearing bulkhead and a threaded aperture that are disposed about an axis;
a case;
a bearing coupled to the case to support the case for rotation about the axis relative to the housing;

a bearing adjuster threadably engaged to the threaded aperture and abutting the bearing, the bearing adjuster having a plurality of circumferentially spaced-apart securing features; and a clip having a mount and a set of mating securing features, the clip being received on the bearing bulkhead such that the mount is secured to the bearing bulkhead in a snap-fit manner and the set of mating securing features are engaged to a corresponding set of the securing features;

wherein each clip is snap-fit to a generally T-shaped portion of the bearing bulkhead.

6. A power transmitting component comprising:

a housing defining a bearing bulkhead and a threaded aperture that are disposed about an axis;

a case;

a bearing coupled to the case to support the case for rotation about the axis relative to the housing;

a bearing adjuster threadably engaged to the threaded aperture and abutting the bearing, the bearing adjuster having a plurality of circumferentially spaced-apart securing features;

a clip having a mount and a set of mating securing features, the clip being received on the bearing bulkhead such that the mount is secured to the bearing bulkhead in a snap-fit manner and the set of mating securing features are engaged to a corresponding set of the securing features; and a fastener received through a fastener aperture in the clip and threadably engaged to the bearing bulkhead;

wherein the clip has a seat, a first spring member and a second spring member, the first and second spring members being coupled to opposite ends of the seat, wherein the seat abuts an end of the bearing bulkheads and wherein the first and second members apply a compressive force to the bearing bulkhead.

7. The power transmitting component of claim 6, wherein the first spring member terminates at a first foot, and wherein the first foot is received into a first groove in the bearing bulkhead, the first groove extending perpendicular to the axis.

8. The power transmitting component of claim 7, wherein the second spring member comprises a second foot, and wherein the second foot is received into a second groove in the bearing bulkhead, the second groove extending perpendicular to the axis.

9. The power transmitting component of claim 6, wherein the fastener aperture is slotted in a direction that is parallel to the axis.

\* \* \* \* \*